United States Patent [19]

Ludin

[11] 3,869,082

[45] Mar. 4, 1975

[54] DATA STORAGE AND RETRIEVAL SYSTEM

[75] Inventor: Ludwig Ludin, Anglikon, Switzerland

[73] Assignee: Camille Bauer Messinstrumente AG, Wohlen, Switzerland

[22] Filed: Jan. 29, 1973

[21] Appl. No.: 327,504

[30] Foreign Application Priority Data

Feb. 2, 1972 Sweden .............................. 1548/72

[52] U.S. Cl. ................ 235/61.11 H, 235/61.12 R, 235/61.12 C, 235/61.12 N

[51] Int. Cl. ......................... G06k 7/08, G06k 19/06

[58] Field of Search . 235/61.7 B, 61.12 N, 61.12 C, 235/61.12 R, 61.11 H; 340/149 A

[56] References Cited

UNITED STATES PATENTS

| | | | |
|---|---|---|---|
| 2,007,883 | 7/1935 | Spahn | 235/61.12 R |
| 2,512,879 | 6/1950 | Roggenstein | 235/61.11 H |
| 2,546,784 | 3/1951 | Roggenstein | 235/61.11 H |
| 3,044,694 | 7/1962 | Davidson et al. | 235/61.11 H |
| 3,189,731 | 6/1965 | Bowman | 235/61.11 H |
| 3,465,131 | 9/1969 | Ten Eyck | 235/61.12 R |
| 3,731,085 | 11/1970 | Bostrom | 235/61.7 B |

*Primary Examiner*—Daryl W. Cook
*Attorney, Agent, or Firm*—Murray Schaffer

[57] ABSTRACT

A data storage and retrieval system comprising in combination a reading device and a document card. The reading device comprises a plurality of sensing electrodes, a counter electrode and a source of alternating potential connected therebetween, the sensing electrodes being offset from said counterelectrode. The card comprises at least one conductive layer having an area in which at least one hole is adapted to be punched, and being positionable in the reading device so that the area in which the holes are adapted to be punched corresponds to the position of the sensing electrodes. The conductive layer functions as a capacitive coupling between the sensing electrodes and the counter-electrode respectively. The reading device including discriminator means is connected to the sensing electrodes by which the capacitance sensed by the sensing electrode may be derived.

10 Claims, 3 Drawing Figures

DATA STORAGE AND RETRIEVAL SYSTEM

BACKGROUND OF THE INVENTION

The present invention relates to a data storage and retrieval system and particularly to a system in which the information is stored on a card, check or the like as a function of the electrical capacitance of the combination of a conductive layer in which punched holes are provided.

In German patent publication 2 127 949 a storage arrangement is known, exclusively adapted to the readout of perforated tapes, in which a metallic or metallicly coated information carrier is used. In this arrangement the carrier to be read is positioned between two plates each provided with a patterned grid of diagonal and longitudinal conductive lines which serve as the interrogation and signal output conductors. The electrically conductive information carrier is separated from the electrically conductive grids by a dielectric layer and is itself connected to a reference potential such as a result As aresult that portion of the information carrier which is whole or free of any perforations creates a shield between the two opposed conductive grid plates, while those perforated portions of the carrier capacitively couple the interrogation and signal output lines corresponding thereto. In order to activate the reading process an interrogation current is fed to a selected interrogation line. This current can take a path to one or more of the signal output lines only when a perforated position or hole is arranged exactly at the desired junction line opposite each other and at which the opposed lines of the interrogation and signal output patterns lie. By this principle it is therefore possible to tune or synchronize three parameters with each other. That is, it is possible to make an exact spacial alignment of three areas lying in three different planes corresponding to the carrier and the two plates by which a selected interrogating line can be fed or the holes generally made to operatively connect the corresponding signal output lines.

The aforementioned device has the disadvantage that independent writing or storage devices and separate readout devices are required. As a result very strict geometric conditions must be met in order that the two units match in operation. In addition, this device can not read or sense any falsification or distortion of the information carrier. So, for example, even though the fraudulent insertion of conductive material into a punch hole of the information carrier is possible to vary the information content of the read out, the apparatus will be unable to determine its appearance or existance.

From U.S. Pat. No. 3,189,731 a scanning device is known which also operates on the principle of measuring capacitance. It is, however, exclusively employed in a system to scan a dielectric recording carrier or track provided with applied or superimposed raised markings. These marks being the indicia of the desired information can be made of any suitable material although it is preferred that they be electrically conductive. Groups of reading electrodes are arranged in the device to scan the markings on one side of the recording track. These electrodes are capacitively coupled with a counterelectrode situated in an immediately opposing position to the other side of the dielectric carrier. This direct capacitive coupling permits a measurement to be obtained as soon as a marking passes beneath the scanning electrode and the change in impedance resulting therefrom is determined by measuring devices arranged with respect to each scanning electrode.

This latter system can not be used for determining the characteristics and identity of a check, credit card or the like. Aside from the fact that a high degree of technical expertise and complexity is required to provide recording carriers with the applied printed, embossed or raised markings utilizing ordinary and not special material, the surety and trustworthiness of such a system is not obtained. Applied markings can be easily detatached or removed either intentionally or unintentionally. Lastly, the scanning of the individual raised marks is not well defined and the mark may be accidentally or even intentionally altered so that the device may be made to give a false reading.

It is the object of the present invention to provide a data storage and retrieval system for mechanical readout which overcomes the defects and disadvantages of the prior art.

It is another object of the present invention to provide a system which is simple to build and which is easy and economical to use.

It is another object of the present invention to provide a system, wherein the document card is formed from a punched card provided with an electrically conductive layer, whose capacitance at particular positions and points can be easily read.

It is still another object of the present invention to provide a system which is provided with a high degree of surity, trustworthiness and ability to avoid accidental or willful distortion, change, modification or other distructive or fraudulent acts.

It is another object of the present invention to provide a system which overall makes it possible to "write" or encode the card with the same apparatus by which it is read, or in a correspondingly formed apparatus.

It is further an object of the present invention to provide a system which is particularly adapted for use with checks, credit cards, or the like wherein absolute accuracy and assurance is required.

These objects, others as well as numerous advantages will be apparent from the following disclosure of the present invention.

SUMMARY OF THE INVENTION

In accordance with the present invention the aforementioned objects are obtained by providing a document card and a cooperating reading machine. The document card comprises at least one layer of electrically conductive material in which one or more holes are adapted to be punched. The reading device comprises a plurality of sensing electrodes arranged to read only one side of the document card, and an inductive generating or counter-electrode and a source of alternating potential connected thereacross. The counter electrode is offset from the sensing electrodes and the document card is arranged in the device so that it acts as a capacitive coupling between itself and the counter electrode on one hand and itself and the sensing electrodes on the other, thus functioning as the counter-electrode itself. The sensing electrode each connected to discriminator means by which the frequency, amplitude or phase angle modulation of the current sensed by the sensing electrodes is converted into a suitable output.

The conductive layer should at least be coated with a non-conductive and highly-dielectric material. Preferably, however, it is laminated as a unitary body between two outer layers of plastic material which both isolates the conductive layer against tampering but also electrically insulates it.

The reading device is provided with a plurality of sensing electrodes positioned in a predefined array and preferably comprise electrodes which double as punches to form the holes in the card at corresponding positions. In this case the opposing surface of the reading device is provided with a perforated matrix. Preferably the counter electrode is located on the side of the card where the sensors are also located, although it may be offset as required on the opposite side.

In accordance with the present invention the discriminator is constructed so as to provide a pulse output in binary form so that output simply is indicative of the presence or absence of a conductive coupling.

Full details of the present invention as contained in a preferred form are set forth in the following description and is seen in the attached drawing.

DESCRIPTION OF INVENTION

Figure 1:
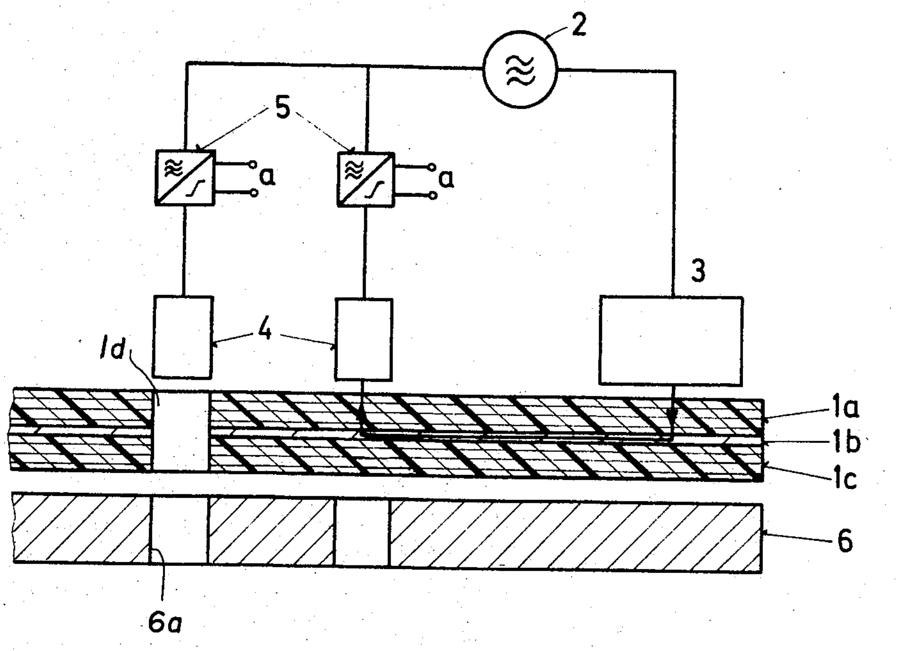
FIG. 1 shows in diagrammatic form the system of the present invention, and in schematic form the information carrier, and the combined writing and read-out device.

As seen from FIG. 1 an information carrier 1 such as a credit card, check, identification card or the like is provided comprising preferably three layers. The inner layer 1*b* is coated with a highly dielectric material to form out layers 1*a* and 1*c*. Preferably the inner layer is sandwiched between two sheets of a soft plastic material such as polyethylene, polypropylene, or kraft or other paper, etc. which encloses and surrounds the conductive layer into a unitary cohesive card. The coating acts to isolate the conductive layer from willful distortion or tampering and electrically insulates it as well. The relative thicknesses of the layers is not critical at all and will be chosen to provide a card which is strong and non-distructable but which has an inner layer 1*b* of the desired electrical characteristics.

The card is provided with one or more holes 1*d* located in one part of the card and which in fact constitutes the information data carried by the card. The holes are provided in a predetermined array providing the total body of information and may be arranged in one or more ranks, files or other arrangement as desired in its area. The holes may be formed in any manner by any suitable punch equipment, but as will be seen hereafter, it is an advantage of the present invention that they may be formed by the same device which also reads the card. An advantage of encasing the conductive layer in soft plastic is that when the holes are punched the material may be made to flow and cover the cut edge inner of the hole, thus completely insulating the hole as well.

The read-out device comprises a high frequency alternating potential source 2 to which a large faced counter electrode 3 is connected. The electrode comprises the generating source by which an inductance is passed via a high frequency stream to the conductive layer 1*b*. Spaced and offset from the generating electrode 3 are a plurality of electrodes forming sensors 4. The sensors 4 are arranged in the array within a given area as desired to serve in combination with holed areas of the card, and preferably comprise punch rods serving as sensors by which the cards may also be punched. The sensors 4 are each connected to a discriminator 5 itself connected to the potential source 2. The discriminator responds to modulation and changes in frequency, amplitude or phase angle and compares them to the corresponding values fed into the system from the source 2. Preferably the discriminator is such that a binary output is provided, indicative of both a similar and dissimilar comparison.

The sensors 4 are mounted in suitable and conventional means to be reciprocable with respect to the card so that they may be pressed downwardly to punch the card with the appropriate hole as well as to read the card. The sensors are normally positioned, for readout, a short distance above the surface of the carrier card at substantiall the same distance as is the face of the counter electrode 3. The carrier cars is supported on its opposite side by support 6 which is provided with a hole matrix 6*a* corresponding to the sensors 4 with which it cooperates to punch the card.

When the card 1 is placed in position in the apparatus a capacitive coupling is formed between itself and the electrode 4 and itself and the sensors 4. The induced current passing via the arrows shown through the entire length and breadth of the conductive layer 16. Thus it will be seen that the electrode 3 can be placed at any position with respect to the sensors 4, and does not need to be positioned in direct opposition to the heads as is necessary in the previously known device. The electrode 3 and sensors 4 are preferably located to the same side of the card 1 but it need not be so and the electrode 3 may be situated on the far or opposing side of the card, with all or a portion of the support 6 removed.

The discriminators 5 have outputs which may be connected to a suitable data processing device or the like.

To read the card the sensors 4 are placed in normal operating position spaced from the surface of the card. The presence of either a hole or of the solid, undamaged or tampered card, changes the capacitive coupling between the conductive layer 1*b* of the card and the sensors 4 located at the particular hole position. This change in capacitance is passed to the associated discriminator which responds to the modulation of frequency magnitude or phase angle. The encoding of the card comprises the setting of one or more holes in predetermined arrangement. Thus the output of the discriminator will identify this arrangement.

The discriminators 5 provide, in response to the modulation of the capacitive coupling a binary signal "0" or "1" at their outputs compared to the magnitude and phase of the high frequency fed into the system and corresponding to whether a hole or a complete card is located beneath the associated sensor. If a solid portion or untampered portion of the card is located beneath the head the discriminator is impressed with a high frequency current corresponding in frequency and phase to that produced by the potential source 2, and fed into the system by the electrode 3. As a result a binary read out such as for example "0" will be produced at the output *a*. On the other hand if a hole 1*d* is found beneath the sensor the discriminator will be provided with a modulated frequency and phase differing from that of the infeed. For all such modulated readings whether they be higher or lower the discriminator will produce a binary read out signal "1."

Since the holes 1*d* are isolated and insulated by the encased material and since the capacitive coupling depends upon the flow of current through the entire layer 1*b* tampering with the card will not produce a changed reading. The value for the magnitude or phase angle of the high frequency stream as impressed on the discriminator is tuned exactly to the characteristic properties of the conductive layer 1*b* and its distance from the scanning head 4. Thus even if conductive or non-conductive material is subsequently stuffed into an existing hole the discriminator will continue to read the existance of the hole since the added material will not be in circuit with the conductive layer. Thereby, falsification or willful changing of the punched information by subsequent manipulation is practically avoided.

By this system the electrically conductive layer of information carrier, i.e. the document card functions, so to say, as the coupling electrode between the reading head or sensors and the counter electrode. Thus in the absence of a hole or punched opening opposite the sensor a capacitive coupling is formed between the generating electrode and the scanning head via the conductive layer causing the discriminator to produce an output signal corresponding thereto. If on the other hand a hole in fact is positioned opposite to the scanning head the capacitive coupling of the scanning head with the generating electrode is shielded by the air gap and for all intents practically interrupted. As a result of this construction stray capacitances between the marginal areas of a hole in the document and the associated sensor are extraordinarily slight, so that the theoretically exact predefined capacitive coupling of the sensors with the generating electrode does not significantly affect the discriminator and these spurious signals to the discriminator are suppressed.

The present system insures against willful falsification or distortion. The sensor electrode reacts very sensitively to the distance of the conductive layer from it, therefore any alteration subsequent to the issuance of the check or card can be detected. For example, if a small metal plate were inserted in one of the holes in the card it would be extremely difficult if not impossible to make it exactly the same as the conductive layer, and therefore it would not lie at the correct distance from the sensor; as a consequence, a different reading would be obtained.

Figure 2:
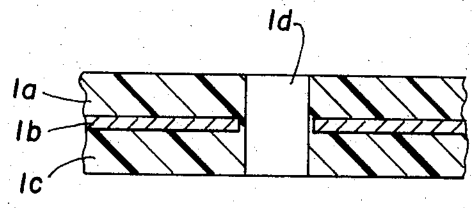
FIG. 2 is an enlarged section of the information carrier of FIG. 1 showing the detail of the punched hole.
Figure 3:
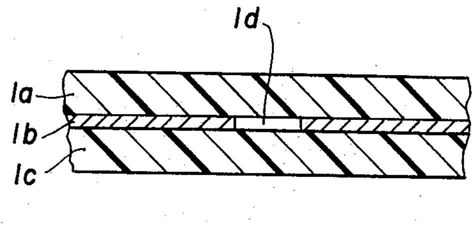
FIG. 3 is a view of a modified information carrier.

A further advantage arises from the use of a carrier in which the conductive layer is covered by a dielectric material, and particularly when it is sandwiched between two layers of soft or malleable plastic. During the hole punching step, the hole puncher or piston rod not only makes a hole in the conductive layer conforming truly to the diameter of the punch, but the punch will upset the plastic material and will cause the plastic to flow and be pulled into the hole formed to cover the inner peripheral edge, as seen in FIG. 2. Thus the inner edge of the hole as well as the surfaces of the conductive layers are insulated and isolated. The subsequent insertion of metallic material in the hole will not make contact with the conductive layer and therefore will not effect the reading of the card.

In FIG. 2 a variant of the information carrier is shown comprising a layer of conductive material 1*b* which is pre-punched with holes 1*d* before being coated with the non-conductive material. The inner layer is completely encased within the continuous dielectric coverings 1*a* and 1*c*. Punching must be done before encapsulating the layer. If done afterwards it would destroy the card, rendering it obviously void.

An advantage of the present invention over that disclosed in the mentioned German publication lies in the fact that the complicated spacial arrangement wherein three relatively small areas are required to overly each other is avoided. The relatively simple requirement of the present invention for an array of sensors corresponding to an array of hole positions reduces both the complexity of construction and use.

The present invention has further advantages in that is enables various constructions, embodiments and combinations to be effected, which can not be obtained with any of the known systems. Because the generating electrode is offset from the area scanned by the sensors, the informational areas on the card can be at any desired position and in any array. The generating electrode may be placed on the side of the card, where the sensors are located, or on the opposite or reverse side. Further, the space or area beneath the card opposed to the sensors may be reserved for the location of a hole matrix so that the use of sensors which are in fact punch rods etc. may be made, the same sensors serving the dual purpose of scanning and punching the selected hole. Thus the same apparatus can be utilized both as the "writing" or storage input mechanism as well as the read out device, without one function influencing the other. In each instance, the conductive layer provides the electrical capacitance coupling between the generating electrode and the individual sensors; the positions of the "writing" punch heads and the positions of the corresponding reading heads are identical.

A still further advantage of the present invention lies in the ability of providing a binary readout or output from the discriminator. The discriminator is designed to provide an output of either "1" or "0" corresponding to the presence or absence of a capacitive coupling between the sensors and the metallic conductive layer. This is an improvement over U.S. Pat. No. 3,189,731 wherein only one capacitance change is derived by the connected amplifier and repeated at its output.

The card or information carrier may be made from more or less than three layers. It is possible that an embodiment may be made of only two layers so long as in the reading device an isolating or insulating insert or layer is provided. The cooperative arrangement of punches, which serve also as the read-out sensing electrodes makes it possible to modify the information stored on the card immediately and at any time during use. Thus the cards may be changed at the time goods are purchased or cash amounts exchanged by punching the card automatically to show the new balance or new condition of the account. It will thus be obvious that the present system may be used in banking situations to provide a fool-proof deposit and withdrawal system, checking system, and in credit card systems wherein direct access to a central memory bank and storage system may be desired.

Various other modifications and embodiments will of course be evident to those skilled in this art. Accordingly the foregoing disclosure is to be taken as illustrative only, and not limiting of the scope of the present invention.

What is claimed:

1. A data storage and retrieval system comprising in combination a reading device and a document card, said reading device comprising a plurality of sensing electrodes, a counter electrode and a source of alternating potential connected therebetween, said sensing electrodes being offset from said counterelectrode, said card comprising at least one conductive layer having an area in which at least one hole is adapted to be punched, said card being positionable in said reading device so that said area in which said holes are adapted to be punched corresponds to the position of said sensing electrodes, said conductive layer functioning as a capacitive coupling between said sensing electrodes and said counter-electrode respectively, said reading device including discriminator means connected to said sensing electrodes by which the capacitance sensed by the sensing electrode may be derived.

2. The system according to claim 1 wherein the conductive layer is sandwiched between a pair of non-conductive layers.

3. The system according to claim 1 wherein the sensors and the counter electrode are arranged on the same side of the card.

4. The system according to claim 1 wherein said discriminator is adapted to derive modulation of amplitude and/or frequency or phase angle of said alternating potential.

5. The system according to claim 4 wherein said discriminator is adapted to provide a binary pulse output.

6. The system according to claim 1 wherein at least one of said sensing electrodes is arranged by simultaneously forming a punch rod by which a hole can be punched into the card.

7. The system according to claim 6 wherein a perforated matrix is arranged on the side of said card opposite to said punch rod sensing electrode.

8. A data punch card for use in the system of claim 1 comprising at least one layer of electrical conductive material encased within a dielectric covering, said layer being provided with at least one hole and forming an insulated active electrode providing an electrically conductive path within the capacitive detecting circuit.

9. The data punch card according to claim 8 wherein only said electrical layer is punched.

10. A data punch card comprising at least one layer of electrically conductive material encased within a dielectric covering, said card being provided with at least one punch hole, the dielectric covering being of soft or malleable plastic material, which ensures upset of the plastic material in the punch area during punching operation and the covering of the inner peripheral edge of the hole in the conductive layer.

* * * * *

UNITED STATES PATENT AND TRADEMARK OFFICE

CERTIFICATE OF CORRECTION

PATENT NO. : 3,869,082

DATED : March 4, 1975

INVENTOR(S) : LUDWIG LUDIN

It is certified that error appears in the above-identified patent and that said Letters Patent are hereby corrected as shown below:

On the cover sheet, under "FOREIGN APPLICATION PRIORITY DATA" the country should be -- Switzerland -- (not Sweden) .

Signed and Sealed this

*twenty-sixth* Day of *August 1975*

[SEAL]

*Attest:*

RUTH C. MASON
*Attesting Officer*

C. MARSHALL DANN
*Commissioner of Patents and Trademarks*